(12) United States Patent
Oku et al.

(10) Patent No.: US 10,603,883 B2
(45) Date of Patent: Mar. 31, 2020

(54) STRETCHED LAMINATED FILM

(71) Applicant: MITSUI CHEMICALS, INC., Minato-ku, Tokyo (JP)

(72) Inventors: Tatsuya Oku, Ichihara (JP); Tomohiro Abe, Ichihara (JP); Satoshi Ikeda, Ichihara (JP); Kiminori Noda, Ichihara (JP); Makoto Egawa, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 247 days.

(21) Appl. No.: 15/515,554

(22) PCT Filed: Sep. 25, 2015

(86) PCT No.: PCT/JP2015/077088
§ 371 (c)(1),
(2) Date: Mar. 29, 2017

(87) PCT Pub. No.: WO2016/052326
PCT Pub. Date: Apr. 7, 2016

(65) Prior Publication Data
US 2017/0217144 A1    Aug. 3, 2017

(30) Foreign Application Priority Data

Sep. 30, 2014   (JP) ................. 2014-200805

(51) Int. Cl.
*B32B 27/32* (2006.01)
*B65D 65/40* (2006.01)
(Continued)

(52) U.S. Cl.
CPC .............. *B32B 27/32* (2013.01); *B32B 27/00* (2013.01); *B32B 27/06* (2013.01); *B65D 65/40* (2013.01);
(Continued)

(58) Field of Classification Search
CPC ......... B32B 27/32; B32B 27/00; B32B 27/06; B32B 2307/31; B32B 2439/00;
(Continued)

(56) References Cited

U.S. PATENT DOCUMENTS

| | | |
|---|---|---|
| 5,780,168 A | 7/1998 | Satoh et al. |
| 2006/0079646 A1 | 4/2006 | Coppini et al. |
| 2006/0216488 A1 | 9/2006 | Schell et al. |

FOREIGN PATENT DOCUMENTS

| | | |
|---|---|---|
| JP | 08-012828 A | 1/1996 |
| JP | 11-28791 | 2/1999 |

(Continued)

*Primary Examiner* — Michael C Miggins
(74) *Attorney, Agent, or Firm* — Foley & Lardner LLP

(57) ABSTRACT

Disclosed is a stretched laminated film 30 having a heat-sealable layer 10 composed of a resin composition which contains 50 to 97 parts by mass of a propylene-based polymer (A) having a melting point (Tm) of not lower than 120° C. but not higher than 170° C. and comprising more than 50% by mol of a structural unit derived from propylene, 3 to 50 parts by mass of a 1-butene-based polymer (B) having a melting point (Tm) of lower than 120° C. and comprising 10 to 90% by mol of a structural unit derived from 1-butene and 10 to 90% by mol of a structural unit derived from an α-olefin having 3 or 5 to 20 carbon atoms, and optionally 3 to 30 parts by mass of an ethylene α-olefin copolymer (C) comprising 50 to 99% by mol of a structural unit derived from ethylene and 1 to 50% by mol of a structural unit derived from an α-olefin having 3 to 20 carbon atoms, wherein the sum of the component (A) and the component (B) is 100 parts by mass; and a base layer 20.

17 Claims, 1 Drawing Sheet

(51) Int. Cl.
*C08L 23/14* (2006.01)
*B32B 27/00* (2006.01)
*C08L 23/20* (2006.01)
*C08L 23/10* (2006.01)
*B32B 27/06* (2006.01)

(52) U.S. Cl.
CPC ............... *C08L 23/10* (2013.01); *C08L 23/14* (2013.01); *C08L 23/20* (2013.01); *B32B 2307/31* (2013.01); *B32B 2439/00* (2013.01); *C08L 2203/162* (2013.01); *C08L 2205/02* (2013.01)

(58) Field of Classification Search
CPC .......... C08L 23/14; C08L 23/20; C08L 23/10; C08L 2203/162; C08L 2205/02; B65D 65/40
See application file for complete search history.

(56) References Cited

FOREIGN PATENT DOCUMENTS

| | | | | |
|---|---|---|---|---|
| JP | 11028791 | * | 2/1999 | ............. B32B 27/32 |
| JP | 2005-504161 A | | 2/2005 | |
| JP | 2006-212836 A | | 8/2006 | |
| JP | 2009-051212 A | | 3/2009 | |
| JP | 2013-018161 A | | 1/2013 | |

* cited by examiner

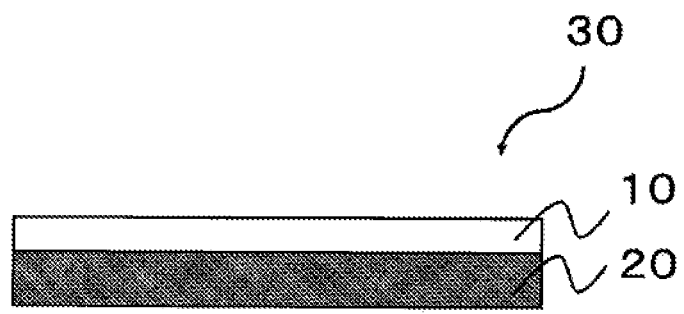

STRETCHED LAMINATED FILM

TECHNICAL FIELD

The present invention relates to a stretched laminated film excellent in heat sealability, more specifically, relates to a stretched laminated film having a heat-sealable layer excellent in heat sealability and hot tack laminated on a base layer, which is particularly suitably used in applications such as high speed packaging.

BACKGROUND ART

Methods for supplying, filling and sealing at high speed are gradually spreading among the industrial world in order to increase the production speed of a package in a work of packaging an item to be packaged such as edible processed products (e.g., fish meat and ham, sausage), dairy products (e.g., cheese and butter) and liquid soups for ready-to-eat foods. Examples of the methods include a method in which a plastic film is continuously fed to form a packaging bag at high speed, and almost simultaneously, an item to be packaged is supplied into a packaging bag in a vertical direction, and the item is filled in the bag, and the bag is sealed, by using a vertical form fill seal machine (VFFS) (e.g., Patent documents 1 and 2). In the method of high speed packaging by using VFFS, the item to be packaged falls in a vertical direction onto a lower seal portion directly after heat sealing in which the lower seal portion is not sufficiently cooled. Accordingly, there is a possibility that the bag is broken with tearing of a lower sealed face when the item to be packaged falls, for example, if the item is heavy or if the shape of item includes a projection. For preventing such defect, there are two main performances required for a heat-sealable layer. One is high heat sealability (i.e., a performance of manifesting high heat sealing strength even if the sealing temperature is lower than a current sealing temperature, or manifesting high heat sealing strength even if the sealing time is short while the sealing temperature is a current sealing temperature). Another one is high hot tack (i.e., a performance of manifesting high adhesion of a sealed portion even if the sealed portion is not sufficiently cooled down and it is still in a high temperature state after heat sealing. In this field, resin films based on a linear low density polyethylene (L-LDPE) have been widely used heretofore. However, needs have been grown to provide a laminated film having more excellent heat sealability and hot tack for use in high speed packaging in order to conform to a further increased filling and sealing speed.

RELATED ART DOCUMENTS

Patent Documents

Patent document 1: JP 2009-51212
Patent document 2: JP 2013-18161

SUMMARY OF INVENTION

Technical Problem

The present invention has been accomplished in view of the above-described condition, and an object thereof is to provide a stretched laminated film which can be used for producing a package without breaking of a sealed portion even in the case of using a high speed sealing and packaging means such as a vertical form fill seal machine (VFFS), a packaging bag obtained from the stretched laminated film; and a package composed of the packaging bag housing an item to be packaged.

Solution to Problem

The gist of the present invention is as described below.
[1] A stretched laminated film having
a heat-sealable layer composed of a resin composition which contains
50 to 97 parts by mass of a propylene-based polymer (A) having a melting point (Tm) of not lower than 120° C. but not higher than 170° C. measured by differential scanning calorimetry (DSC), and comprising more than 50% by mol of a structural unit derived from propylene, and
3 to 50 parts by mass of a 1-butene-based polymer (B) having a melting point (Tm) of lower than 120° C. measured by differential scanning calorimetry (DSC), and comprising 10 to 90% by mol of a structural unit derived from 1-butene and 10 to 90% by mol of a structural unit derived from an α-olefin having 3 or 5 to 20 carbon atoms, wherein the sum of the structural unit derived from 1-butene and the structural unit derived from an α-olefin having 3 or 5 to 20 carbon atoms is 100% by mol,
wherein the sum of the component (A) and the component (B) is 100 parts by mass; and
a base layer.
[2] A stretched laminated film having
a heat-sealable layer composed of a resin composition which contains
50 to 97 parts by mass of a propylene-based polymer (A) having a melting point (Tm) of not lower than 120° C. but not higher than 170° C. measured by differential scanning calorimetry (DSC), and comprising more than 50% by mol of a structural unit derived from propylene,
3 to 50 parts by mass of a 1-butene-based polymer (B) having a melting point (Tm) of lower than 120° C. measured by differential scanning calorimetry (DSC), and comprising 10 to 90% by mol of a structural unit derived from 1-butene and 10 to 90% by mol of a structural unit derived from an α-olefin having 3 or 5 to 20 carbon atoms, wherein the sum of the structural unit derived from 1-butene and the structural unit derived from an α-olefin having 3 or 5 to 20 carbon atoms is 100% by mol, and 3 to 30 parts by mass of an ethylene α-olefin copolymer (C) comprising 5.0 to 99% by mot of a structural unit derived from ethylene and 1 to 50% by mol of a structural unit derived from an α-olefin having 3 to 20 carbon atoms, wherein the sum of the structural unit derived from ethylene and the structural unit derived from an α-olefin having 3 to 20 carbon atoms is 100% by mol,
wherein the sum of the component (A) and the component (B) is 100 parts by mass; and
a base layer.
[3] The stretched laminated film according to [1] or [2], wherein the propylene-based polymer (A) contains 80 to 100% by mass of a propylene-based polymer (a1) having a melting point (Tm) of not lower than 120° C. but lower than 150° C. measured by differential scanning calorimetry (DSC), and 0 to 20% by mass of a propylene-based polymer (a2) having a melting point (Tm) of not lower than 150° C. but not higher than 170° C. measured by the same method, wherein the sum of the component (a1) and the component (a2) is 100% by mass.

[4] The stretched laminated film according to [1] or [2], wherein the propylene-based polymer (A) contains 95 to 99% by mass of a propylene-based polymer (a1) having a melting point (Tm) of not lower than 120° C. but lower than 150° C. measured by differential scanning calorimetry (DSC), and 1 to 5% by mass of a propylene-based polymer (a2) having a melting point (Tm) of not lower than 150° C. but not higher than 170° C. measured by the same method, wherein the sum of the component (a1) and the component (a2) is 100% by mass.

[5] The stretched laminated film according to [1] or [2], wherein the 1-butene-based polymer (B) is a 1-butene-based polymer (B') having a melting point (Tm) of lower than 120° C. measured by differential scanning calorimetry (DSC) and comprising 10 to 90% by mol of a structural unit derived from 1-butene and 10 to 90% by mol of a structural unit derived from propylene, wherein the sum of the structural unit derived from 1-butene and the structural unit derived from propylene is 100% by mol.

[6] The stretched laminated film according to [5], wherein the 1-butene-based polymer (B') contains one or more 1-butene-based polymers selected from the group consisting of a 1-butene-based polymer (b1) having a melting point (Tm) of not lower than 90° C. but not higher than 110° C. measured by differential scanning calorimetry (DSC), a 1-butene-based polymer (b2) having a melting point (Tm) of not lower than 65° C. but lower than 90° C. measured by the same method and a 1-butene-based polymer (b3) having a melting point (Tm) of lower than 65° C. measured by the same method.

[7] The stretched laminated film according to [6], wherein the 1-butene-based polymer (B') contains two or more 1-butene-based polymers selected from the group consisting of the 1-butene-based polymer (b1), the 1-butene-based polymer (b2) and the 1-butene-based polymer (b3).

[8] The stretched laminated film according to [6], wherein the 1-butene-based polymer (b1) and the 1-butene-based polymer (b2) are polymers produced by using a metallocene catalyst.

[9] A packaging bag in which the peripheral parts of the stretched laminated film according to [1] or [2] are sealed while the heat-sealable layers are facing inside.

[10] A package composed of the packaging bag according to [9] housing an item to be packaged.

Advantageous Effects of Invention

The stretched laminated film of the present invention shows sufficient heat sealing strength when heat sealing is carried out not only at temperatures of 110° C. or higher but also at lower temperatures in the range of around 70 to 100° C. In addition, the lowering of hot tack intensity at 110° C. or higher which is problematic in a film having low temperature heat scalability as described above is diminished, and sufficient hot tack intensity is manifested at high temperatures. Therefore, the stretched laminated film of the present invention is suitably used in applications such as a packaging film used in performing high speed filling•sealing of an item to be packaged by using, for example, a vertical form fill seal (VFFS) machine.

BRIEF DESCRIPTION OF DRAWING

FIG. 1 is a schematic cross-sectional view showing one example of the stretched laminated film of the present invention.

MODES FOR CARRYING OUT THE INVENTION

Embodiments of the present invention will be illustrated in detail below.
(Stretched Laminated Film)
The stretched laminated film according to the first embodiment is
a stretched laminated film having
a heat-sealable layer composed of a resin composition which contains
50 to 97 parts by mass of a propylene-based polymer (A) having a melting point (Tm) of not lower than 120° C. but not higher than 170° C. measured by differential scanning calorimetry (DSC), and comprising more than 50% by mol of a structural unit derived from propylene, and
3 to 50 parts by mass of a 1-butene-based polymer (B) having a melting point (Tm) of lower than 120° C. measured by differential scanning calorimetry (DSC), and comprising 10 to 90% by mol of a structural unit derived from 1-butene and 10 to 90% by mol of a structural unit derived from an α-olefin having 3 or 5 to 20 carbon atoms, wherein the sum of the structural unit derived from 1-butene and the structural unit derived from an α-olefin having 3 or 5 to 20 carbon atoms is 100% by mol,
wherein the sum of the component (A) and the component (B) is 100 parts by mass; and
a base layer.
The stretched laminated film according to the second embodiment is
a stretched laminated film having
a heat-sealable layer composed of a resin composition which contains
50 to 97 parts by mass of the above component (A),
3 to 50 parts by mass of the above component (B), and
3 to 30 parts by mass of an ethylene•α-olefin copolymer (C) comprising 50 to 99% by mol of a structural unit derived from ethylene and 1 to 50% by mol of a structural unit derived from an α-olefin having 3 to 20 carbon atoms, wherein the sum of the structural unit derived from ethylene and the structural unit derived from an α-olefin having 3 to 20 carbon atoms is 100% by mol,
wherein the sum of the component (A) and the component (B) is 100 parts by mass; and
a base layer.

One example of the stretched laminated film of the present invention is explained below referring to FIG. 1. A stretched laminated film 30 shown in FIG. 1 is constituted of a heat-sealable layer 10 and a base layer 20. The heat-sealable layer 10 constituting the stretched laminated film 30 contains the component (A) as the major ingredient. In addition to the component (A), the component (B) is compounded at a specific ratio in the first embodiment, and the component (B) and the component (C) are compounded at a specific ratio in the second embodiment.

In general, the stretched laminated film is preferably a stretched laminated film in which the heat-sealable layer 10 and the base layer 20 are stretched at the same stretching ratio together (co-stretched laminated film), from the standpoint of easy production. However, an embodiment in which the base layer 20 is not stretched and only the heat-sealable layer 10 is stretched may also be permissible depending on the application. That is, in the present invention, "stretched laminated film" denotes a laminated film in which at least the heat-sealable layer is stretched, and the stretching of the base is optional.

For producing the co-stretched laminated film, for example, the resin composition constituting the heat-sealable layer and the resin composition constituting the base layer are fed to two extruders respectively, to which a T die is connected respectively, and then they are co-extruded and molded to produce a non-stretched laminate in first. In this case, the thickness of the non-stretched laminate may be set, for example, in a range of 50 μm to 5000 μm. The ratio of the thickness of the non-stretched heat-sealable layer to the thickness of the non-stretched base layer may be set, for example, in a range of 1:99 to 99:1.

The non-stretched laminate is stretched, for example by a stretching machine, to obtain a co-stretched laminated film. The thickness of the whole stretched laminated film such as a co-stretched laminated film is preferably 1 μm to 500 μm.

Embodiments of the present invention are described above. However, these are only examples of the present invention, and a variety of constitutions other than those described above can be adopted.

Subsequently, the heat-sealable layer 10 and the base layer 20 constituting the stretched laminated film 30 are explained.

(Heat-Sealable Layer)

The heat-sealable layer 10 in the stretched laminated film according to the first embodiment is composed of a resin composition obtained by compounding the component (A) and the component (B) at a suitable ratio. The heat-sealable layer 10 in the stretched laminated film according to the second embodiment is composed of a resin composition obtained by compounding the component (A), the component (B) and the component (C) at a suitable ratio.

The resin composition constituting the heat-sealable layer 10 in the stretched laminated film according to the first embodiment contains 50 to 97 parts by mass of the component (A) and 3 to 50 parts by mass of the component (B), wherein, the sum of the component (A) and the component (B) is 100 parts by mass. A preferable resin composition contains 60 to 95 parts by mass of the component (A) and 5 to 40 parts by mass of the component (B). A more preferable resin composition contains 70 to 90 parts by mass of the component (A) and 10 to 30 parts by mass of the component (B)

The resin composition constituting the heat-sealable layer 10 in the stretched laminated film according to the second embodiment contains 3 to 30 parts by mass, preferably 3 to 20 parts by mass, more preferably 5 to 15 parts by mass of the component (C), with respect to 100 parts by mass of the sum of the component (A) and the component (B) in the first embodiment.

[Component (A)]

The component (A) is a propylene-based polymer having a melting point (Tm) of not lower than 120° C. but not higher than 170° C. measured by differential scanning calorimetry (DSC), and comprising more than 50% by mol of a structural unit derived from propylene. The propylene-based polymer (A) may be homopolypropylene, a random copolymer of propylene and α-olefin having 2 to 20 carbon atoms (excluding propylene), or a propylene block copolymer. The ratio of the structural unit derived from propylene in the component (A) is usually more than 50% by mol, preferably not less than 60% by mol, more preferably not less than 70% by mol. In the present invention, homopolypropylene and/or a random copolymer of propylene and α-olefin having 2 to 20 carbon atoms (excluding propylene) is preferably used.

Particularly, homopolypropylene is preferably used as the component (A) from the standpoint of imparting heat resistance and stiffness to the heat-sealable layer 10. In contrast, a random copolymer of propylene and α-olefin having 2 to 20 carbon atoms (excluding propylene) is preferably used from the standpoint of imparting flexibility and transparency to the heat-sealable layer 10. It is also one preferable embodiment to use homopolypropylene and a random copolymer of propylene and α-olefin having 2 to 20 carbon atoms (excluding propylene) together.

The α-olefin to be copolymerized with propylene includes, for example, ethylene, 1-butene, 1-pentene, 3-methyl-1-butene, 1-hexene, 4-methyl-1-pentene, 1-octene, 1-decene, 1-dodecene, 1-tetracene, 1-hexadecene, 1-octadecene and 1-eicosene. In one preferable embodiment, two or more α-olefins are used. Particularly, an isotactic propylene-based polymer is preferable as the component (A).

The isotactic propylene-based polymer is a propylene-based polymer in which the isotactic pentad fraction measured by an NMR method is 0.9 or more, preferably 0.95 or more. The isotactic pentad fraction is 90% or more, preferably 95% or more when expressed in percentage.

The isotactic pentad fraction (mmmm fraction) indicates the existence ratio of an isotactic chain in terms of a pentad fraction unit in the molecular chain measured by using $^{13}$C-NMR, and is the fraction of a propylene monomer unit situated at the center of a chain wherein five propylene monomer units are meso-linked in series. Specifically, it is calculated as the fraction of the mmmm peak in all absorption peaks of the methyl carbon region observed in the $^{13}$C-NMR spectrum.

The mmmm fraction is determined according to the following formula from absorption intensities represented by $P_{mmmm}$ (absorption intensity derived from the third methyl group at a site wherein five propylene units are isotactic-linked in series) and $P_w$ (absorption intensity derived from all methyl groups of the propylene unit) in the $^{13}$C-NMR spectrum.

$$mmmm\ fraction = P_{mmmm}/P_w$$

NMR measurement is conducted, for example, as described below using an NMR measuring apparatus. That is, 0.35 g of a sample is dissolved in 2.0 mL of hexachlorobutadiene with heating. The solution is filtrated through a glass filter (G2), then, 0.6 ml of deuterated benzene is added, and the solution is charged into an NMR tube having an internal diameter of 10 mm. $^{13}$C-NMR is measured at 120° C. The cumulated number is 10000 times or more.

The melting point (Tm) of the component (A) measured by differential scanning calorimetry (DSC) is not less than 120° C. and not more than 170° C., preferably not less than 125° C. and not more than 168° C. or lower.

An embodiment in which the component (A) contains 80 to 100% by mass, preferably 85 to 100% by mass, more preferably 90 to 99% by mass, particularly preferably 95 to 99% by mass of a propylene-based polymer (a1) having a melting point (Tm) of not less than 120° C. and not less than 150° C. measured by differential scanning calorimetry (DSC) and 0 to 20% by mass, preferably 0 to 15% by mass, more preferably 1 to 10% by mass, particularly preferably 1 to 5% by mass of a propylene-based polymer (a2) having a melting point (Tm) of not less than 150° C. and not more than 170° C. measured by the same method wherein the sum of the component (a1) and the component (a2) is 100% by mass, is also preferable.

The melting point (Tm) of the component (a1) is not less than 120° C. and less than 150° C., preferably 125° C. to 145° C., more preferably 128° C. to 142° C. The melting point (Tm) of the component (a2) is not less than 150° C. and not more than 170° C., preferably 155° C. to 170° C., more preferably 160° C. to 170° C.

By using the component (A) having a melting point (Tm) in the specific range, the heat-sealable layer 10 is endowed with excellent sealing strength, hot tack, moldability and heat resistance. Furthermore, it is preferable that the melting heat quantity (ΔH) obtained simultaneously is 50 mJ/mg or more. The melting point (Tm) and the melting heat quantity (ΔH) of the component (A) are measured, for example, as described below.

That is, using DSC Pyris 1 or DSC 7 manufactured by Perkin Elmer Co. Ltd. under a nitrogen atmosphere (20 ml/min), about 5 mg of a sample is heated up to 200° C., and it is kept for 10 minutes, and then it is cooled down to −100° C. at a rate of 10° C./min. After keeping at −100° C. for 1 minute, the sample is heated up to 200° C. at a rate of 10° C./min. The melting point can be determined from the summit of the crystal melting peak during the process. Also the melting heat quantity (ΔH) can be determined from the peak area.

The melt flow rate (MFR; ASTM D1238, 230° C. under 2.16 kg load) of the component (A) is preferably 0.01 to 400 g/10 min, more preferably 0.1 to 100 g/10 min. By using the component (A) having such MFR value, flowability of a resin composition is improved, and even a relatively large sheet is easily molded.

When a random copolymer of propylene and α-olefin (excluding propylene) is used as the component (A), it is preferable that the α-olefin is selected from α-olefins having 2 to 20 carbon atoms of (excluding propylene). The content of the α-olefin is preferably 0.1 to 8% by mol, more preferably 0.2 to 7.5% by mol, particularly preferably 0.3 to 7% by mol.

The molecular weight distribution (Mw/Mn) of the component (A) determined by gel permeation chromatography (GPC) is preferably not more than 3.0, more preferably 2.0 to 3.0, particularly preferably 2.0 to 2.5.

The molecular weight distribution (Mw/Mn) can be measured as described below by using, for example, a gel permeation chromatograph Alliance GPC type 2000 manufactured by Waters Corporation. As the separation column, two columns of TS kgel (registered trademark) GNH6-HT and two columns of TS kgel (registered trademark) GNH6-HTL manufactured by Tosoh Corp. are used, both the columns have a diameter of 7.5 mm and a length of 300 mm, the column temperature is 140° C., o-dichlorobenzene (manufactured by Wako Pure Chemical Industries, Ltd.) and 0.025% by mass of BHT (manufactured by Takeda Pharmaceutical Company Limited) as an antioxidant are used as a mobile phase, the solution is allowed to move at a rate of 1.0 ml/min, the sample concentration is 15 mg/10 mL, the sample injection amount is 500 μl, and a differential refractometer is used as a detector. Standard polystyrene manufactured by Tosoh Corporation is used for molecular weight: $Mw<1000$ and $Mw>4\times10^6$ and standard polystyrene manufactured by Pressure Chemical Company is used for molecular weight: $1000 \leq Mw \leq 4\times10^6$.

The tensile elastic modulus of the component (A) is preferably 500 MPa or more. The tensile elastic modulus is a value measured according to JIS K6301 using JIS No. 3 dumbbell under conditions of a span interval of 30 mm, a tension rate of 30 mm/min and a temperature of 23° C.

The component (A) can be produced by a variety of methods, and for example, can be produced by using a stereoregular catalyst. Specifically, the component (A) can be produced by using a catalyst formed from a solid titanium catalyst component, an organometal compound catalyst component, and optionally an electron donor. Specific examples of the solid titanium catalyst component include a solid titanium catalyst component composed of a carrier having a specific surface area of 100 m²/g or more supporting thereon titanium trichloride or a titanium trichloride composition, or a solid titanium catalyst component composed of a carrier having a specific surface area of 100 m²/g or more supporting thereon magnesium, a halogen, an electron donor (preferably, an aromatic carboxylate or an alkyl group-containing ether) and titanium as essential ingredients. Furthermore, the component (A) can be produced also by using a metallocene catalyst.

As the organometal compound catalyst component, an organoaluminum compound is preferable. Specific examples of the organoaluminum compound include trialkylaluminum, dialkylaluminum halide, alkylaluminum sesquihalide, and alkylaluminum dihalide. The organoaluminum compound can be appropriately selected depending on the kind of the titanium catalyst component to be used.

As the electron donor, organic compounds having a nitrogen atom, a phosphorus atom, a sulfur atom, a silicon atom, a boron atom or the like can be used. In particular, ester compounds and ether compounds having the atom described above are preferable.

The catalyst may be further activated by a means such as co-pulverization, and the α-olefin may be pre-polymerized.

[Component (B)]

The component (B) is a 1-butene-based polymer having a melting point (Tm) of lower than 120° C. measured by differential scanning calorimetry (DSC), and comprising 10 to 90% by mol of a structural unit derived from 1-butene and 10 to 90% by mol of a structural unit derived from an α-olefin having 3 or 5 to 20 carbon atoms, wherein the sum of the structural unit derived from 1-butene and the structural unit derived from an α-olefin having 3 or 5 to 20 carbon atoms is 100% by mol.

The α-olefin having 3 or 5 to 20 carbon atoms is preferably propylene from the standpoint of general versatility and easy availability. In the following explanations, a 1-butene-based polymer when propylene is used as the α-olefin is referred to as a component (B'). The melting point (Tm) of the component (B') is preferably 40° C. to 115° C., more preferably 45° C. to 110° C.

A preferable embodiment of the component (B) is a 1-butene-based polymer comprising 10 to 80% by mol of a structural unit derived from 1-butene and 20 to 90% by mol of a structural unit derived from an α-olefin having 3 or 5 to 20 carbon atoms (particularly preferably, a structural unit derived from propylene). When such 1-butene-based polymer is used, the resin composition tends to manifest excellent heat sealability and hot tack, and the handling ability of a resin composition is also excellent.

A more preferable embodiment of the component (B') is a propylene•1-butene copolymer comprising 10 to 50% by mol of a structural unit derived from 1-butene and 50 to 90% by mol of a structural unit derived from propylene.

It is preferable that the component (B') contains one or more 1-butene-based polymers selected from the group consisting of a 1-butene-based polymer (b1) having a melting point (Tm) of not lower than 90° C. but not higher than 110° C. measured by differential scanning calorimetry (DSC), a 1-butene-based polymer (b2) having a melting point (Tm) of not lower than 65° C. but lower than 90° C. measured by the same method and a 1-butene-based polymer (b3) having a melting point (Tm) of lower than 65° C. measured by the same method. Furthermore, it is more preferable that the component (B') contains two or more 1-butene-based polymers selected from the group consisting of the component (b1), the component (b2) and the component (b3). Specifically, the embodiment include an embodiment in which the component (b1) and the component (b2) are used together, an embodiment in which the component (b2) and the component (b3) are used together, an embodiment in which the component (b1) and the component (b3) are used together, and an embodiment in which all the component (b1) to component (b3) are used together. Among them, the embodiments in which the component (b2) is used as an essential component, for example, the combination of the component (b1) and the component (b2) and the combination of the component (b2) and the component (b3), are more preferable.

The melting point (Tm) of the component (B) can be measured by the following method. That is, using DSC manufactured by Seiko Instruments Inc., about 5 mg of a sample is crammed into a measurement aluminum pan, heated up to 200° C. at a rate of 100° C./min, kept at 200° C. for 5 minutes, thereafter cooled down to −100° C. at a rate of 10° C./min, and then heated up to 200° C. at a rate of 10° C./min. The melting point (Tm) can be determined from its endothermic curve.

The molecular weight distribution (Mw/Mn) of the component (B) determined by gel permeation chromatography (GPC) is preferably not more than 3.0, more preferably 2.0 to 3.0, particularly preferably 2.0 to 2.5. By setting Mw/Mn in the above range, the content of low molecular weight components in the component (B) can be suppressed. As a result, bleed from the surface layer of the stretched laminated film is less likely to occur, and sticking and blocking of the surface layer in storing the stretched laminated film can be suppressed. The measurement method of Mw/Mn of the component (B) is the same as the measurement method of Mw/Mn of the component (A) explained above.

It is preferable that a relation between the melting point (Tm) and the content M (% by mol) of a structural unit derived from 1-butene, of the component (B), satisfies the following formula.

$$-3.2M+130 \leq Tm \leq 2.3M+155$$

When Tm and M satisfy the above formula, a laminated film excellent in low temperature heat sealability, giving high heat sealing strength and causing less decrease of sealing strength due to aging after stretching can be obtained.

The melt flow rate (MFR; ASTM D1238, 230° C., under 2.15 kg load) of the component (B) is preferably 0.1 to 30 g/10 min, more preferably 0.5 to 20 g/10 min, particularly preferably 1.0 to 10 g/10 min.

The component (B') as a preferable embodiment of the component (B) can be suitably produced, for example, by copolymerizing 1-butene and propylene in the presence of a catalyst containing a metallocene compound. Specifically, for example, the component (b1) having a melting point (Tm) of not lower than 90° C. but not higher than 110° C. and the component (b2) having a melting point (Tm) of not lower than 65° C. but lower than 90° C., that were previously explained, can be suitably produced by using a metallocene catalyst according to a method described, for example, in WO2004/087775 or WO01/27124. The production method of the component (b3) having a melting point (Tm) of lower than 65° C. is not particularly restricted, and a metallocene catalyst may be used or a Ziegler-Natta catalyst may be used.

It is preferable that the component (B) is a 1-butene-based polymer obtained, for example, by copolymerizing 1-butene and an α-olefin having 3 or 5 to 20 carbon atoms (preferably, propylene) in the presence of a catalyst containing a transition metal compound (1a) represented by the following general formula (1a). The transition metal compound (1a) is a compound in which a ligand composed of a substituted cyclopentadienyl ring and a substituted fluorenyl ring cross-linked via carbon is coordinated to a transition metal atom.

It is preferable that the catalyst containing the transition metal compound (1a) contains at least one compound selected from the group consisting of an organometal compound (2a), an organoaluminumoxy compound (2b), and a compound (2c) reacting with the transition metal compound (1a) to form an ion pair.

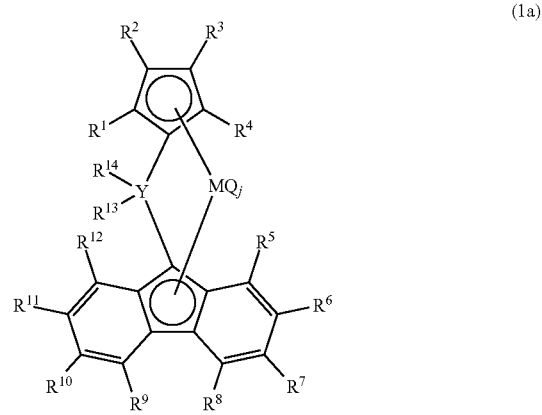

(1a)

wherein the formula (1a), $R^1$ and $R^3$ represent a hydrogen atom, $R^2$ and $R^4$ represent a hydrocarbon group or a silicon-containing group, $R^2$ and $R^4$ may be the same or different, $R^5$ to $R^{14}$ represent a hydrogen atom, a hydrocarbon group or a silicon-containing group, $R^5$ to $R^{12}$ may be the same or different, and of $R^5$ to $R^{12}$, substituents bonded to adjacent carbons may be combined together to form a ring, $R^{13}$ and $R^{14}$ may be the same or different, $R^{13}$ and $R^{14}$ may be combined together to form a ring, M is a Group 4 transition metal, Y is a carbon atom, Q is selected from a halogen, a hydrocarbon group, an anion ligand or a neutral ligand which can be coordinated with a lone pair of electron, each Q being the same or different, and j is an integer of 1 to 4.

Specific examples of the above hydrocarbon group include linear hydrocarbon groups such as methyl group, ethyl group, n-propyl group, allyl group, n-butyl group, n-pentyl group, n-hexyl group, n-heptyl group, n-octyl group, n-nonyl group and n-decanyl group; branched hydrocarbon groups such as an isopropyl group, tert-butyl group, amyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group and 1-methyl-1-isopropyl-2-methylpropyl group; cyclic saturated hydrocarbon groups such as cyclopentyl group, cyclohexyl group, cycloheptyl group, cyclooctyl group, norbornyl group and adamantyl group; cyclic unsaturated hydrocarbon groups such as phenyl group, tolyl group, naphthyl group, biphenyl group, phenanthtyl group and anthracenyl group; saturated hydrocarbon groups obtained by substitution of cyclic unsaturated hydrocarbon groups such as a benzyl group, cumyl group, 1,1-diphenylethyl group and triphenylmethyl group; hetero atom-containing hydrocarbon groups such as methoxy group, ethoxy group, phenoxy group, furyl group, N-methylamino group, N,N-dimethylamino group, N-phenylamino group, pyryl group and thienyl group.

Specific examples of the above silicon-containing group include trimethylsilyl group, triethylsilyl group, dimethylphenylsilyl group, diphenylmethylsilyl group and triphenylsilyl group.

Among $R^5$ to $R^{12}$, substituents bonded to adjacent carbons may be combined together to form a ring. Specific examples of the substituted fluorenyl group in such a case include benzofluorenyl group, dibenzofluorenyl group, octahydrodibenzofluorenyl group, octamethyl-octahydrodibenzofluorenyl group and octamethyltetrahydrodicyclo-pentafluorenyl.

$R^{13}$ and $R^{14}$ are preferably aryl groups. The aryl groups include cyclic unsaturated hydrocarbon groups, saturated hydrocarbon groups substituted with cyclic unsaturated hydrocarbon groups, hetero atom-containing cyclic unsaturated hydrocarbon groups such as furyl group, pyryl group and thienyl group, described above. The aryl groups of $R^{13}$ and $R^{14}$ may be the same or different, and may be combined together to form a ring.

$R^2$ and $R^4$ as the substituent bonded to a cyclopentadienyl ring are each preferably a hydrocarbon group having 1 to 20 carbon atoms. As the hydrocarbon group having 1 to 20 carbon atoms, the hydrocarbon groups described above can be exemplified. Among them, $R^2$ is more preferably a bulky substituent such as tert-butyl group, adamantyl group and triphenylmethyl group. $R^4$ is more preferably a substituent which is sterically smaller than $R^2$, such as methyl group, ethyl group and n-propyl group. The term "sterically small" mentioned above means that the volume occupied by the substituent is small.

Among $R^5$ to $R^{12}$ as the substituent bonded to a fluorenyl ring, any two or more of $R^6$, $R^7$, $R^{10}$ and $R^{11}$ are each preferably a hydrocarbon group having 1 to 20 carbon atoms. As the hydrocarbon group having 1 to 20 carbon atoms, the hydrocarbon groups described above can be exemplified. It is preferable that symmetrical groups, namely, $R^6$ and $R^{11}$, and $R^7$ and $R^{10}$ are the same group, particularly from the standpoint of easiness of synthesis of a ligand. Such preferable embodiments include also a case in which $R^6$ and $R^7$ form an aliphatic ring (AR-1) and $R^{10}$ and $R^{11}$ form an aliphatic ring (AR-2) which is identical to the aliphatic ring (AR-1).

Y crosslinking a cyclopentadienyl ring and a fluorenyl ring is a carbon atom. It is preferable that $R^{13}$ and $R^{14}$ as the substituent bonded to the Y represent simultaneously an aryl group having 6 to 20 carbon atoms. The aryl group having 6 to 20 carbon atoms includes cyclic unsaturated hydrocarbon groups, saturated hydrocarbon groups substituted by cyclic unsaturated hydrocarbon groups, and hetero atom-containing cyclic unsaturated hydrocarbon groups, described above. Also, $R^{13}$ and $R^{14}$ may be the same or different, and may be combined together to form a ring. As such substituent, fluorenylidene group, 10-hydroanthracenylidene group, dibenzocycloheptadienylidene group are preferable.

M is a Group 4 transition metal, and the specific examples thereof includes Ti, Zr and Hf.

Q is selected from a halogen, a hydrocarbon group, an anion ligand or a neutral ligand which can be coordinated with a lone pair of electron, each Q being the same or different. j is an integer of 1 to 4. When j is 2 or more, a plurality of Q may be mutually the same or different.

Specific examples of the halogen include fluorine, chlorine, bromine and iodine. Specific examples of the hydrocarbon group include the same examples as described above. Specific examples of the anion ligand include alkoxy groups such as methoxy, tert-butoxy and phenoxy; carboxylate groups such as acetate and benzoate; sulfonate groups such as mesylate and tosylate. Specific examples of the neutral ligand which can be coordinated with a lone pair of electron include organophosphorus compounds such as trimethylphosphine, triethylphosphine, triphenyl-phosphine and diphenylmethylphosphine; ethers such as tetrahydrofuran, diethyl ether, dioxane and 1,2-dimethoxyethane. It is preferable that at least one of Q is a halogen atom or an alkyl group.

The transition metal compound (1a) as described above includes, but not limited to, dimethylmethylene(3-tert-butyl-5-methylcyclopentadienyl)fluorenylzirconium dichloride, isopropylidene(3-tert-butyl-5-methylcyclopentadienyl)(2,7-di-tert-butylfluorenyl)zirconium dichloride, isopropylidene(3-tert-butyl-5-methylcyclopentadienyl)(3,6-di-tert-butylfluorenyl)zirconium dichloride, isopropylidene(3-tert-butyl-5-methylcyclopentadienyl)(octamethyloctahydridedibenzfluorenyl)zirconium dichloride, diphenylmethylene(3-tert-butyl-5-methylcyclopentadienyl)(fluorenyl)zirconium dichloride, diphenylmethylene(3-tert-butyl-5-methylcyclopentadienyl)(2,7-di-tert-butylfluorenyl)zirconium dichloride, diphenylmethylene(3-tert-butyl-5-methylcyclopentadienyl)(3,6-di-tert-butylfluorenyl)zirconium dichloride and diphenylmethylene(3-tert-butyl-5-methylcyclopentadienyl)(octamethyloctahydridedibenzfluorenyl)zirconium dichloride.

It is preferable that the catalyst which is suitably used in producing the component (B), preferably the component (b1) and the component (b2), contains at least one compound selected from the group consisting of the organometal compound (2a), the organoaluminumoxy compound (2b), and the compound (2c) reacting with the transition metal compound (1a) to form an ion pair, together with the transition metal compound (1a) described above. These components (2a), (2b) and (2c) are not particularly restricted, and compounds described in WO2004/087775 or WO01/27124 can be preferably used. Specific examples thereof include those described below.

As the organometal compound (2a), organometal compounds of Groups 1, 2 and Groups 12, 13 as described below are used.

  (2a-1) General Formula:

wherein $R^a$ and $R^b$ may be mutually the same or different and represent a hydrocarbon group having 1 to 15 carbon atoms, preferably 1 to 4 carbon atoms, X represents a halogen atom, m is a number satisfying 0<m≤3, n is a number satisfying 0≤n<3, p is a number satisfying 0≤p<3 and q is a number satisfying 0≤q<3, and m+n+p+q=3.

Specific examples of such compound (2a-1) include trimethylaluminum, triethylaluminum, triisobutylaluminum and diisobutylaluminum hydride.

  (2a-2) General Formula:

wherein $M^2$ represents Li, Na or K, and $R^a$ represents a hydrocarbon group having 1 to 15 carbon atoms, preferably 1 to 4 carbon atoms.

Specific examples of such compound (2a-2) include LiAl(C$_2$H$_5$)$_4$, and LiAl(C$_7$H$_{15}$)$_4$.

$$R^a R^b M^3 \quad \text{(2a-3) General Formula:}$$

wherein R$^a$ and R$^b$ may be mutually the same or different and represent a hydrocarbon group having 1 to 15 carbon atoms, preferably 1 to 4 carbon atoms, and M$^3$ is Mg, Zn or Cd.

Among these organometal compounds (2a), an organoaluminum compound is preferable. The organometal compounds (2a) may each be used singly or two or more of them and may be used in combination.

The organoaluminumoxy compound (2b) may be a conventionally known aluminoxane, or may also be a benzene-insoluble organoaluminumoxy compound as exemplified in JP-A No. 2-78687.

The conventionally known aluminoxane can be produced, for example, by methods as described below, and is obtained, usually, as a solution of a hydrocarbon solvent.

1) A method in which an organoaluminum compound such as trialkylaluminum is added to a hydrocarbon solvent suspension of a compound containing absorption water or a salt containing crystalline water, for example, magnesium chloride hydrate, copper sulfate hydrate, aluminum sulfate hydrate, nickel sulfate hydrate or cerium(III) chloride, and the absorption water or the crystalline water is reacted with the organoaluminum compound.

2) A method in which water, ice or water vapor is allowed to act directly on an organoaluminum compound such as trialkylaluminum in a medium such as benzene, toluene, diethyl ether and tetrahydrofuran.

3) A method in which an organotin oxide such as dimethyltin oxide and dibutyltin oxide is reacted with an organoaluminum compound such as trialkylaluminum in a medium such as decane, benzene and toluene.

The aluminoxane may contain a small amount of an organometal component other than aluminoxane. It may also be permissible that, from the recovered solution of the above aluminoxane, a solvent or an unreacted organoaluminum compound is removed by distillation, then it is re-dissolved in a solvent or suspended in a poor solvent for aluminoxane. The organoaluminum compound which is used in preparing an aluminoxane includes, specifically, the same organoaluminum compounds as exemplified as the organoaluminum compound belonging to the component (2a-1). Specifically, trialkylaluminum and tricycloalkylaluminum are preferable, trimethylaluminum is particularly preferable. The organoaluminum compounds are used each singly or two or more of them are used in combination.

As the benzene-insoluble organoaluminumoxy compound (2b), for example, those showing a dissolution amount in benzene of 60° C. of usually 10 mmol or less, preferably 5 mmol or less, particularly preferably 2 mmol or less in terms of an aluminum atom are preferable, namely, those insoluble or poorly-soluble in benzene are preferable. The dissolution amount is determined as follows: an organoaluminumoxy compound corresponding to 100 mg of an aluminum atom is suspended in 100 ml of benzene, the suspension is mixed for 6 hours while stirring at 60° C., then, filtrated through a G5 glass filter equipped with a jacket with heating at 60° C., a solid separated on the filter is washed with 50 ml of benzene of 60° C. four times and the filtrate is recovered, and the existing amount (mmol) of an aluminum atom present in the filtrate is measured. The organo-aluminumoxy compounds (2b) are used each singly or two or more of them are used in combination.

The compound (2c) reacting with the transition metal compound (1a) to form an ion pair includes, for example, Lewis acids, ionic compounds, borane compounds and carborane compounds described, for example, in JP-A No. 1-501950, JP-A No. 1-502036, JP-A No. 3-179005, JP-A No. 3-179006, JP-A No. 3-207703, JP-A No. 3-207704 and U.S. Pat. No. 5,321,106. Furthermore, heteropoly compounds and isopoly compounds are also mentioned. The compounds (2c) are used each singly or two or more of them are used in combination.

In production of the component (B), when a catalyst using an organoaluminumoxy compound (2b) such as methylaluminoxane together with the transition metal compound (1a) is used, particularly high polymerization activity can be preferably attained.

The polymerization catalyst used for production of the component (B) may be one using a carrier as required, or may also be one containing another co-catalyst component.

Such catalyst may be prepared by previously mixing components or supporting components on a carrier, alternatively, components may be added to the polymerization system simultaneously or sequentially.

It is suitable that the component (B) is obtained by copolymerizing 1-butene and an α-olefin such as propylene in the presence of the above catslyst. In copolymerization, it is advantageous that monomers are used in amounts by which the amounts of structural units in the component (B) to be produced show desired ratio, specifically, the molar ratio of propylene/1-butene is 50/50 to 90/10, preferably 60/40 to 90/10, more preferably 70/30 to 90/10.

Copolymerization conditions are not particularly restricted. For example, the polymerization temperature is in the range of usually −50° C. to +200° C., preferably 0° C. to 170° C., the polymerization pressure is usually ordinary pressure to 10 MPa gauge pressure, preferably ordinary pressure to 5 MPa gauge pressure. The polymerization reaction can be conducted by any of batch mode, semicontinuous mode and continuous mode. Furthermore, it is also possible to conduct polymerization in two or more divided stages having different reaction conditions.

The molecular weight of the component (B) can be controlled by allowing hydrogen to exist in the polymerization system or changing the polymerization temperature, and can also be controlled by the amount of the component (2a), (2b) or (2c) in the catalyst. When hydrogen is added, the addition amount is adequately around 0.001 to 100 NL per kg of a monomer.

[Component (C)]

The component (C) is an ethylene·α-olefin copolymer comprising 50 to 99% by mol of a structural unit derived from ethylene and 1 to 50% by mol of a structural unit derived from an α-olefin having 3 to 20 carbon atoms, wherein the sum of the structural unit derived from ethylene and the structural unit derived from an α-olefin having 3 to 20 carbon atoms is 100% by mol. The kind of the α-olefin is appropriately selected depending on the application in which a stretched laminated film is used, and α-olefins having 3 to 10 carbon atoms are preferable.

It is preferable that the component (C) has properties described below.

(a) Density (ASTM 1505 23° C.) is 0.850 to 0.910 g/cm$^3$, preferably 0.860 to 0.905 g/cm$^3$, more preferably 0.865 to 0.895 g/cm$^3$.

(b) Melt flow rate (MFR; ASTM 01238, 190° C., under 2.16 kg load) is 0.1 to 150 g/10 min, preferably 0.3 to 100 g/10 min.

By using the component (C) satisfying such properties, heat sealing is easy even at relatively low temperatures.

The production method of the component (C) is not particularly restricted. The component (C) can be produced, for example, by copolymerizing ethylene and an α-olefin using a radical polymerization catalyst, a Phillips catalyst, a Ziegler-Natta catalyst or a metallocene catalyst. As the component (C), commercially available products may be used.

When the component (C) is produced by using a metallocene catalyst among the above catalysts, the molecular weight distribution (Mw/Mn) of the copolymer is usually 3 or less, that is, use of a metallocene catalyst is preferable. As the metallocene catalyst, for example, catalysts disclosed in WO2004/029062 are suitable.

The degree of crystallization of the component (C) measured by an X ray diffraction method is usually 40% or less, preferably 0 to 39%, more preferably 0 to 35%.

Specific examples of the α-olefin having 3 to 20 carbon atoms used in production of the component (C) include propylene, 1-butene, 1-pentene, 1-hexene, 4-methylpentene, 1-octene, 1-decene and 1-dodecene. These may be each used singly or two or more of them may be used in combination. Among them, propylene, 1-butene, 1-hexene and 1-octene are preferable, 1-butene is particularly preferable.

The component (C) comprises 50 to 99% by mol of a structural unit derived from ethylene and 1 to 50% by mol of a structural unit derived from an α-olefin having 3 to 20 carbon atoms wherein the sum of the structural unit derived from ethylene and the structural unit derived from an α-olefin having 3 to 20 carbon atoms is 100% by mol. A more preferable embodiment of the component (C) contains 60 to 95% by mol of a structural unit derived from ethylene and 5 to 40% by mol of a structural unit derived from an α-olefin having 3 to 20 carbon atoms. By adjusting the contents of structural units in such ranges, heat sealing is easy even at relatively low temperatures.

The molecular structure of the component (C) may be a linear structure, or may also be a branched structure having a long or short side chains. It is also possible to use a plurality of different ethylene•α-olefin copolymers in admixture.

(Base Layer)

The stretched laminated film 30 includes two kinds of stretching modes as described above. One is a co-stretched laminated film in which both the heat-sealable layer 10 and the base layer 20 are stretched, and the other is a stretched laminated film in which the base layer 20 is not stretched and only the heat-sealable layer 10 is stretched. The former can be produced by laminating a non-stretched heat-sealable layer onto a non-stretched base layer, then, co-stretching them, and the latter can be produced by laminating a stretched heat-sealable layer onto a non-stretched base layer. From the standpoint of convenience of production, for example, a co-stretched laminated film is preferable.

As the base layer 20 of a stretched laminated film, those conventionally known are appropriately adopted depending on the application. Specific examples thereof include thermoplastic resin films such as a film composed of a polyester typified by polyethylene terephthalate and polyethylene naphthalate, a polycarbonate film, a polyamide film composed of nylon 6 or nylon 66, an ethylene vinyl alcohol copolymer film, a polyvinyl alcohol film, a polyvinyl chloride film, a polyvinylidene chloride film, and a film composed of a polyolefin such as polypropylene.

The base layer 20 may be composed of one layer or composed of two or more layers depending on the object.

Furthermore, the thermoplastic resin film as the base layer 20 may be a laminate with a heterogeneous inorganic material obtained by vapor deposition of an inorganic material such as aluminum, zinc and silica, or its oxide.

(Application)

A packaging bag can be fabricated by heat-sealing the peripheral parts of the stretched laminated films 30 while the heat-sealable layers 10 are facing inside. A content (an item to be packaged) is housed in the packaging bag, and if necessary, an additional heat sealing operation is carried out, thus a package can be obtained.

The stretched laminated film 30 constituting a packaging bag and a package containing an item to be packaged has the heat-sealable layer 10 composed of a resin composition containing the specific components (A) and (B), and optionally the component (C). The heat-sealable layer 10 manifests sufficient heat sealing strength and higher hot tack by far than current strength, even when sealing is conducted at the heat sealing temperature generally adopted in the bag production industry, and manifests sufficient heat sealing strength and hot tack even at temperatures equal to or lower than the heat sealing temperature usually adopted in the industry. Therefore, the stretched laminated film 30 is suitably used as a laminated film for packaging which can provide a tough packaging bag and a tough package causing no bag breaking at a seal portion even in the case of use of a high speed sealing•packaging means like a vertical form fill seal (VFFS) machine.

EXAMPLES

Next, the stretched laminated film of the present invention and the packaging bag obtained from this will be illustrated in detail by examples shown below, but the present invention is not limited to them.

First, the methods for measuring the physical properties of the component (A) and the component (B) are shown below.

[Molecular Weight Distribution (Mw/Mn)]

The molecular weight distribution (Mw/Mn) was measured as described below using a gel permeation chromatograph Alliance GPC type 2000 manufactured by Waters Corporation. As the separation column, two columns of TS kgel (registered trademark) GNH6-HT and two columns of TS kgel (registered trademark) GNH6-HTL manufactured by Tosoh Corp. were used, both the columns had a diameter of 7.5 mm and a length of 300 mm, the column temperature was 140° C., o-dichlorobenzene (manufactured by Wako Pure Chemical Industries, Ltd.) and 0.025% by mass of BHT (manufactured by Takeda Pharmaceutical Company Limited) as an antioxidant were used as a mobile phase, the solution was allowed to move at a rate of 1.0 ml/min, the sample concentration was 15 mg/10 mL; the sample injection amount was 500 µl, and a differential refractometer was used as a detector. Standard polystyrene manufactured by Tosoh Corporation was used for molecular weight: $Mw<10^3$ and $Mw>4\times10^6$ and standard polystyrene manufactured by Pressure Chemical Company was used for molecular weight: $10^3 \leq Mw \leq 4\times10^6$.

[Content of Ethylene, Propylene and α-Olefin in Polymer]

The contents of ethylene, propylene and α-olefin were measured as described below using an NMR measurement apparatus JNM type GX-500 manufactured by JEOL Ltd. A sample (0.35 g) was dissolved in 2.0 ml of hexachlorobutadiene with heating. The solution was filtrated through a glass filter (G2), then, 0.5 ml of deuterated benzene was added, and the solution was charged into an NMR tube having an internal diameter of 10 mm, and $^{13}$C-NMR measurement was performed at 120° C. The cumulated number was 10000 times or more. The compositions of ethylene, propylene and α-olefin were quantified according to the resultant $^{13}$C-NMR spectrum.

[Melting Point (Tm) of Component (A)]

Using DSC Pyris 1 or DSC 7 manufactured by Perkin Elmer Co. Ltd., about 5 mg of a sample was heated up to 200° C. and kept at the same temperature for 10 minutes, thereafter, cooled down to −100° C. at a rate of 10° C./min, under a nitrogen atmosphere (20 ml/min). The sample was kept at −100° C. for 1 minute, then, heated up to 200° C. at a rate of 10° C./min. The melting point (Tm) was determined from the summit of the crystal melting peak during the process.

[Melting Point (Tm) of Component (B)]

Using DSC manufactured by Seiko instruments Inc., about 5 mg of a sample was crammed into a measurement aluminum pan, heated up to 200° C. at a rate of 100° C./min, kept at 200° C. for 5 minutes, thereafter, cooled down to −100° C. at a rate of 10° C./min, then, heated up to 200° C. at a rate of 10° C./min, and the melting point (Tm) was determined from its endothermic curve.

[Melt Flow Rate (MFR)]

The melt flow rate (MFR) of the components (A) and (B) was measured at 230° C. under a load of 2.16 kg according to ASTM 01238. For the component (C), conditions of 190° C. and 2.16 kg load were adopted.

[Heat Sealing Strength]

Stretched laminated films were laminated so that heat-sealable layers overlapped each other, and the both surfaces of the laminated films were sandwiched by Teflon (registered trademark) shoots having a thickness of 50 μm, to fabricate a test piece. Then, heat seal bars of a heat seal tester (type TB-701B manufactured by Tester Sangyo Co., Ltd.) were set so as to be 5 mm in width×300 mm in length, and the upper and lower seal bars were set at the same temperature. The test piece (Teflon (registered trademark) sheet/film/film/Teflon (registered trademark) sheet) was sandwiched between the heat seal bars, and heat-sealed under a pressure of 0.1 MPa for 0.5 seconds. Then, the Teflon (registered trademark) sheets were removed, and the heat-sealed films were allowed to stand at a room temperature of about 23° C. for 1 day. A slit having a width of 15 mm was made so as to include heat-sealed parts of the film, and non-sealed parts were fixed to chucks of a tensile tester ("IM-20ST manufactured by INTESCO Co., Ltd."). The 180° peeling strength of the film was measured at a rate of 300 mm/min. The above operation was repeated five times, and the average value thereof was adopted as the heat sealing strength.

[Hot Tack Intensity]

Stretched laminated films prepared by a method described later were laminated in the form of a strip so that heat-sealable layers overlapped each other and sandwiched by PET films having a thickness of 12 μm, to fabricate a test piece. A hot tack tester (Model HT manufactured by H. W. THELLER INC., see U.S. Pat. Nos. 5,331,858 and 5,847,284) had a sealed area having a lateral width of 25 mm and a depth of 12.7 mm, upper and lower seal bars were adjusted to the same temperature, the test piece was heat-sealed under a pressure of 0.1 MPa for 0.5 seconds, then, 0.06 seconds after, the 180° peeling strength of the film was measured at a rate of 400 mm/min. The above operation was repeated five times, and the average value of the maximum strengths was adopted as the hot tack intensity.

A synthesis example of a metallocene type complex as a constitutional component of an olefin polymerization catalyst and a preparation example of a propylene•1-butene copolymer (components (b2) and (b1)) obtained by using the metallocene catalyst are shown below.

Synthesis Example

Synthesis of Metallocene Type Complex (1) Preparation of 1-tert-butyl-3-methylcyclopentadiene Under a nitrogen atmosphere, to a solution of 0.90 mol of tert-butylmagnesium chloride in 450 ml of diethyl ether (2.0 mol/solution) was added 350 ml of dehydrated diethyl ether, and a solution of 43.7 g (0.45 mol) of 3-methylcyclopentenone in 150 ml of dehydrated diethyl ether was dropped while keeping the temperature at 0° C. under cooling with ice, thereafter, the mixture was stirred at room temperature for 15 hours. Furthermore, into the reaction solution was dropped a solution of 80.0 g (1.50 mol) of ammonium chloride in 350 ml of water while keeping the temperature at 0° C. under cooling with ice, thereafter, 2500 ml of water was added and the mixture was stirred. The organic phase of the resultant liquid was separated, and washed with water. Furthermore, to the organic phase was added 82 ml of a 10% hydrochloric acid aqueous solution while keeping the temperature at 0° C. under cooling with ice, thereafter, the mixture was stirred at room temperature for 6 hours. The organic phase of the resultant liquid was further separated, and washed with water, a saturated sodium hydrogen carbonate aqueous solution, water and saturated saline in this order. Then, the organic phase was dried over anhydrous magnesium sulfate (desiccant), the desiccant was filtrated off, and the solvent was distilled off from the filtrate, to obtain a liquid. The liquid was distilled under reduced pressure (45 to 47° C./10 mmHg), to obtain 14.6 g of a pale yellow liquid. The analytical values thereof are shown below.

$^1$H-NMR (270 MHz, in CDCl$_3$, TMS standard) δ 6.31+6.13+5.94+5.87 (s+s+t+d, 2H), 3.04+2.95 (s+s, 2H), 2.17+2.09 (s+s, 3H), 1.27 (d, 9H)

(2) Preparation of 3-tert-butyl-1,6,6-trimethylfulvene

Under a nitrogen atmosphere, into a solution of 13.0 g (95.6 mmol) of 1-tert-butyl-3-methylcyclopentadiene obtained in the above method (1) in 130 ml of dehydrated methanol was dropped 55.2 g (950.4 mmol) of dehydrated acetone while keeping the temperature at 0° C. under cooling with ice, then, 68.0 g (956.1 mmol) of pyrrolidine was dropped, thereafter, the mixture was stirred at room temperature for 4 days. The reaction liquid was diluted with 400 ml of diethyl ether, and further, 400 ml of water was added. The organic phase of the resultant liquid was separated, and washed with 150 ml of a 0.5 hydrochloric acid aqueous solution four times, with 200 ml of water three times and with 150 ml of saturated saline once. Then, the organic phase was dried over anhydrous magnesium sulfate (desiccant), the desiccant was filtrated off, and the solvent was distilled off from the filtrate, to obtain a liquid. The liquid was distilled under reduced pressure (70 to 80° C./0.1 mmHg), to obtain 10.5 g of a yellow liquid. The analytical values thereof are shown below.

$^1$H-NMR (270 MHz, in CDCl$_3$, TMS standard) δ 6.23 (s, 1H), 6.05 (d, 1H), 2.23 (s, 3H), 2.17 (d, 6H), 1.17 (s, 9H)

(3) Preparation of 2-(3-tert-butyl-5-methylcyclopentadienyl)-2-fluorenyl-propane Under cooling with ice, into a solution of 10.1 g (60.8 mmol) of fluorene in 300 ml of THF was dropped a solution of 61.6 mmol of n-butyllithium in 40 ml of hexane under a nitrogen atmosphere, thereafter, the mixture was stirred at room temperature for 5 hours. The resultant dark brown solution was cooled with ice again, and a solution of 11.7 g (66.5 mmol) 3-tert-butyl-1,6,6-trimethylfulvene obtained in the above method (2) in 300 ml of THF was dropped under a nitrogen atmosphere, thereafter, the mixture was stirred at room temperature for 14 hours. Furthermore, the brown solution was cooled with ice, and 200 ml of water was added. The organic phase of the resultant liquid was separated by extracting with diethyl ether. Then, the organic phase was dried over anhydrous magnesium sulfate (desiccant), the desiccant was filtrated off, and the solvent was removed under reduced pressure from the filtrate, to obtain an orange-brown oil. The oil was purified by silica gel column chromatography (developing solvent: hexane), to obtain 3.8 g of a yellow oil. The analytical values thereof are shown below.

$^1$H-NMR (270 MHz, in CDCl$_3$, TMS standard) δ 7.70 (d, 4H), 7.34 to 7.26 (m, 6H), 7.18 to 7.11 (m, 6H), 6.17 (s, 1H), 6.01 (s, 1H), 4.42 (s, 1H), 4.27 (s, 1H), 3.01 (s, 2H), 2.87 (s, 2H), 2.17 (s, 3H), 1.99 (s, 3H), 2.10 (s, 9H), 1.99 (s, 9H), 1.10 (s, 6H), 1.07 (s, 6H)

(4) Preparation of Dimethylmethylene(3-tert-butyl-5-methylcyclopentadienyl)fluorenylzirconium dichloride (Metallocene Type Complex)

Under cooling with ice, into a solution of 1.14 g (3.3 mmol) of 2-(3-tert-butyl-5-methylcyclopentadienyl)-2-fluorenylpropane obtained in the above method (3) in 25 ml of diethyl ether was dropped a solution of 7.7 mmol of n-butyllithium in 5.0 ml of hexane under a nitrogen atmosphere, thereafter, the mixture was stirred at room temperature for 14 hours. To the resultant pink slurry was added 0.77 g (3.3 mmol) of zirconium tetrachloride at −78° C., and the mixture was stirred at −78° C. for several hours, then, stirred at room temperature for 65 hours. The resultant blackish brown slurry was filtrated, and the filtrated material was washed with 10 ml of diethyl ether, extracted with dichloromethane, to obtain a red solution. The solvent of the solution was distilled off under reduced pressure, to obtain 0.53 g of dimethylmethylene(3-tert-butyl-5-methylcyclopentadienyl) fluorenylzirconium dichloride (metaliocene type complex) as a metallocene catalyst in the form of a red-orange solid. The analytical values thereof are shown below.

$^1$H-NMR (270 MHz, in CDCl$_3$, TMS standard) δ 8.11 to 8.02 (m, 3H), 7.82 (d, 1H), 7.56 to 7.45 (m, 2H), 7.23 to 7.17 (m, 2H), 6.08 (d, 1H), 5.72 (d, 1H), 2.59 (s, 3H), 2.41 (s, 3H), 2.30 (s, 3H), 1.08 (s, 9H)

Preparation Example 1

Preparation of Propylene•1-Butene Copolymer (Component (b2))

Into a thoroughly nitrogen purged 2000 ml polymerization apparatus were charged 875 ml of dry hexane, 75 g of 1-butene and 1.0 mmol of triiso-butylaluminum at ambient temperature, and the internal temperature of the polymerization apparatus was heated up to 65° C., and the internal atmosphere was pressurized to 0.7 MPa with propylene. Then, a toluene solution prepared by contacting 0.002 mmol of dimethylmethylene(3-tert-butyl-5-methylcyclopentadienyl)fluorenylzirconium dichloride as the metallocene catalyst obtained in the above synthesis example with methylaluminoxane (manufactured by Tosoh•Finechem Corporation) in an amount of 0.6 mmol in terms of aluminum was added into the polymerization vessel, and polymerization was carried out for 30 minutes while keeping an internal temperature of 65° C. and a propylene pressure of 0.75 MPa, and 20 ml of methanol was added to stop the polymerization. After releasing pressurization, a polymer was allowed to precipitate from the polymerization solution in 2 L of methanol, and dried for 12 hours under vacuum at 130° C., to obtain 152 g of a propylene•1-butene copolymer. In the following explanations, the propylene-1-butene copolymer is abbreviated at "PBR (b2)".

PBR (b2) had a 1-butene content (M) of 19.4% by mol, a melt flow rate (MFR) of 6.5 g/10 min, a molecular weight distribution (Mw/Mn) of 2.11 and a melting point (Tm) of 75.3° C.

Preparation Example 2

Preparation of Propylene•1-Butene Copolymer (Component (b1))

A propylene•1-butene copolymer was obtained in the same manner as in Preparation Example 1, excepting that the use amount of 1-butene was changed to 45 g and the propylene pressure in polymerization (after catalyst addition) was changed to 0.7 MPa in Preparation Example 1 described above. In the following explanations, the propylene•1-butene copolymer is abbreviated as "PBR (b1)".

PBR (b1) had a 1-butene content (M) of 14.5% by mol, a melt flow rate (MFR) of 6.7 g/10 min, a molecular weight distribution (Mw/Mn) of 2.12 and a melting point (Tm) of 98.4° C.

Example 1

(Production of Non-Stretched Laminated Film 1)

A resin composition for a heat-sealable layer and a resin composition for a base layer shown below were fed to two extruders to which a T die was connected, and the extrusion amounts of the extruders were set so that the ratio of the thickness of the heat-sealable layer to the thickness of the base layer (heat-sealable layer/base layer) was 2/23 at die and resin temperatures of 230° C. and the resins were co-extruded and molded, to obtain a non-stretched laminated film 1 having a thickness of 1000 μm.

Resin Composition for Heat-Sealable Layer:

A resin composition obtained by blending the propylene random copolymer (a1) (manufactured by Lyon Dell Basell, trade name: Adsyl5C30F, propylene content=91% by mol, ethylene content=2% by mol, butene content=7% by mol, MFR=5.5 g/10 min, Tm=138° C.) as the component (A) and PBR (b2) obtained in Preparation Example 1 as the component (B) at a mass ratio of r-PP (a1)/PBR (b2)=85/15. The above propylene random copolymer (a1) is abbreviated as "r-PP (a1)", Resin Composition for Base Layer:

Propylene homopolymer (manufactured by Prime Polymer Co., Ltd., PrimePolypro (registered trademark) F113G). (Production of Stretched Laminated film 1)

The non-stretched laminated film 1 was biaxially stretched at vertical×horizontal=5-fold×8-fold by a batch mode twin-screw stretching machine under conditions of a stretching temperature of 158° C. and a stretching rate of 238% (stress relaxation after stretching: 30 seconds), to obtain a stretched laminated film 1 (base layer thickness: 23 μm, heat-sealable layer thickness: 2 μm).

(Measurement of Heat Sealing Strength and Hot Tack Intensity)

Next, the stretched laminated films 1 were laminated so that the heat-sealable layers overlapped each other and the both surfaces of the laminated films were sandwiched by Teflon (registered trademark) sheets having a thickness of 50 μm to fabricate a test piece for measurement of heat sealing strength and sandwiched by PET films having a thickness of 12 μm to fabricate a test piece for measurement of hot tack intensity. The peeling strengths of the test pieces were measured according to the test methods of heat sealing strength and hot tack intensity described above. The physical properties are shown in Table 1.

Example 2

A stretched laminated film 2 was produced in the same manner as in Example 1, excepting that a resin composition described below was used as the resin composition for a heat-sealable layer, and heat sealing strength and hot tack intensity were measured. The results are shown in Table 1.

Resin Composition for Heat-Sealable Layer:

A resin composition obtained by blending r-PP (a1) as the component (A), and PBR (b2) obtained in Preparation Example 1 and PBR (b1) obtained in Preparation Example 2 as the component (B) at a mass ratio of r-PP (a1)/PBR (b2)/PBR (b1)=85/7.5/7.5.

A stretched laminated film 3 was produced in the same manner as in Example 1, excepting that a resin composition described below was used as the resin composition far a heat-sealable layer, and heat sealing strength and hot tack intensity were measured. The results are shown in Table 1.

Resin Composition for Heat-Sealable Layer:

A resin composition obtained by blending r-PP (a1) and a propylene homopolymer (a2) (manufactured by Prime Polymer Co., Ltd., PrimePolypro (registered trademark) F107, MFR=7.2 g/10 min, Tm=168.2° C.) as the component (A), and PBR (b2) obtained in Preparation Example 1 as the component (B) at a mass ratio of (a1)/h-PP (a2)/PBR (b2) =85/7.5/7.5. In the following explanations, the above propylene homopolymer is abbreviated as "h-PP (a2)".

Example 4

A stretched laminated film 4 was produced in the same manner as in Example 1, excepting that a resin composition described below was used as the resin composition for a heat-sealable layer, and heat sealing strength and hot tack intensity were measured. The results are shown in Table 1.

Resin composition for Heat-Sealable Layer:

A resin composition obtained by blending r-PP (a1) as the component (A), PBR (b2) obtained in Preparation Example 1 as the component (B) and an ethylene-1-butene copolymer (manufactured by Mitsui Chemicals, Inc., ethylene content: 90% by mol, MFR=3.6 g/10 min, density=870 kg/m$^3$) as the component (C) at a mass ratio of r-PP (a1)/PBR (b2)/EBR=85/7.5/7.5. The present resin composition is a resin composition containing 8.1 parts by mass of the component (C) with respect to 100 parts by mass of the sum of the component (A) and the component (B). The above ethylene•1-butene copolymer is abbreviated as "EBR".

Example 5

A stretched laminated film 5 was produced in the same manner as in Example 1, excepting that a resin composition described below was used as the resin composition for a heat-sealable layer, and heat sealing strength and hot tack intensity were measured. The results are shown in Table 1.

Resin Composition for Heat-Sealable Layer:

A resin composition obtained by blending r-PP (a1) and h-PP (a2) as the component (A), and PBR (b2) obtained in Preparation Example 1 as the component (B) at a mass ratio of r-PP (a1)/h-PP (a2)/PBR (b2)=85/1.5/13.5.

Comparative Example 1

A stretched laminated film 1' was produced in the same manner as in Example 1, excepting that a resin described below was used as the resin composition for a heat-sealable layer, and heat sealing strength and hot tack intensity were measured. The results are shown in Table 1.

Resin Composition for Heat-Sealable Layer:

A resin composed singly of r-PP (a1) as the component (A).

TABLE 1

| | | | Ex. 1 | Ex. 2 | Ex. 3 | Ex. 4 | Ex. 5 | Comp. Ex. 1 |
|---|---|---|---|---|---|---|---|---|
| Composition of Heat-sealable Layer (wt %) | Component (A) | r-PP (a1) | 85 | 85 | 85 | 85 | 85 | 100 |
| | | h-PP (a2) | | | 7.5 | | 1.5 | |
| | Component (B) | PBR (b1) | | 7.5 | | | | |
| | | PBR (b2) | 15 | 7.5 | 7.5 | 7.5 | 13.5 | |
| | Component (C) | EBR | | | | 7.5 | | |
| Heat Sealing Strength (N/15 mm) Strength after allowing to stand at room temperature for 1 day after heat sealing (0.1 MPa, 0.5 sec) | | 70° C. | 0.11 | 0.11 | 0.11 | 0.11 | 0.11 | 0.00 |
| | | 80° C. | 0.74 | 0.12 | 0.11 | 0.14 | 1.19 | 0.11 |
| | | 90° C. | 3.10 | 2.63 | 0.30 | 2.65 | 4.22 | 0.11 |
| | | 100° C. | 3.79 | 4.04 | 3.66 | 3.90 | 3.85 | 0.13 |
| | | 110° C. | 4.46 | 3.44 | 3.60 | 3.61 | 3.79 | 0.46 |
| | | 120° C. | 3.71 | 3.81 | 3.78 | 3.48 | 3.96 | 3.48 |
| | | 130° C. | 3.58 | 3.52 | 3.45 | 3.34 | 3.63 | 3.52 |
| | | 140° C. | 3.74 | 3.95 | 3.88 | 3.84 | 4.27 | 4.13 |
| | | 150° C. | 4.15 | 3.51 | 3.56 | 3.72 | 3.59 | 3.60 |
| Hot Tack Intensity (N/2.5 mm) Intensity directly after | | 70° C. | 0.24 | 0.12 | 0.11 | 0.13 | 0.43 | 0.09 |
| | | 80° C. | 2.49 | 1.94 | 1.30 | 2.18 | 3.86 | 0.04 |
| | | 90° C. | 2.85 | 2.98 | 3.07 | 2.78 | 3.98 | 0.13 |

TABLE 1-continued

|  |  | Ex. 1 | Ex. 2 | Ex. 3 | Ex. 4 | Ex. 5 | Comp. Ex. 1 |
|---|---|---|---|---|---|---|---|
| (after 0.05 sec) | 100° C. | 3.12 | 2.90 | 3.26 | 3.26 | 3.58 | 1.90 |
| heat sealing | 110° C. | 2.88 | 3.07 | 3.12 | 3.01 | 3.65 | 2.65 |
| (0.1 MPa, 0.5 sec) | 120° C. | 2.86 | 3.06 | 3.26 | 3.03 | 3.25 | 3.17 |
|  | 130° C. | 2.38 | 2.62 | 2.54 | 2.75 | 2.64 | 3.02 |
|  | 140° C. | 2.24 | 2.39 | 1.98 | 2.33 | 2.28 | 2.95 |
|  | 150° C. | 2.07 | 2.44 | 1.49 | 2.26 | 2.08 | 2.86 |

As apparent from the results of Table 1, the stretched laminated films of Examples 1 to 5 were excellent in heat sealing strength. For example, when the heat sealing temperature was 100° C., the heat sealing strength of the stretched laminated film in which the heat-sealable layer was composed only of the component (A) in Comparative Example 1 was approximately 0.1. N/15 mm, while the heat sealing strengths in Examples 1 to 5 were about 40-fold higher. The excellent heat sealability at low temperatures were recognized in a wide heat sealing temperature range of 70 to 120° C. Furthermore, Examples 1 to 5 manifested also higher hot tack intensity than in Comparative Example 1 at low temperatures at which heat sealing strength was manifested, namely, in a range of 80 to 100° C.

Furthermore, as in Example 1, the film manifesting high heat sealing strength at low temperatures showed a tendency of slight decrease of hot tack intensity at 110° C. or higher, while as in Examples 3 and 5, the stretched laminated film obtained from a resin composition in which the propylene homopolymer hPP (a2) believed to contribute to high crystallization speed or high melt tension was further compounded manifested sufficient heat sealing strength at low temperatures of 100° C. or lower, and simultaneously, could suppress lowering of hot tack intensity at the same temperature or higher temperatures.

INDUSTRIAL APPLICABILITY

The stretched laminated film of the present invention is recognized to manifest sufficient heat sealing strength and sufficient hot tack intensity in a wide temperature range. Therefore, the present stretched laminated film is suitably utilized as a packaging film which can produce a package causing no bag breaking at a seal portion even in the case of use of a high speed filling•sealing means such as a vertical form fill seal (VFFS) machine.

EXPLANATION OF NUMERALS

10: heat-sealable layer
20: base layer
30: stretched laminated film

The invention claimed is:

1. A stretched laminated film having
a heat-sealable layer composed of a resin composition which contains
    50 to 97 parts by mass of a propylene-based polymer (A) having a melting point (Tm) of not lower than 120° C. but not higher than 170° C. measured by differential scanning calorimetry (DSC), and comprising more than 50% by mol of a structural unit derived from propylene,
    3 to 50 parts by mass of a 1-butene-based polymer (B) having a melting point (Tm) of lower than 120° C. measured by differential scanning calorimetry (DSC), and comprising 10 to 90% by mol of a structural unit derived from 1-butene and 10 to 90% by mol of a structural unit derived from an α-olefin having 3 or 5 to 20 carbon atoms, wherein the sum of the structural unit derived from 1-butene and the structural unit derived from an α-olefin having 3 or 5 to 20 carbon atoms is 100% by mol, and
    3 to 30 parts by mass of an ethylene α-olefin copolymer (C) comprising 50 to 99% by mol of a structural unit derived from ethylene and 1 to 50% by mol of a structural unit derived from an α-olefin having 3 to 20 carbon atoms, wherein the sum of the structural unit derived from ethylene and the structural unit derived from an α-olefin having 3 to 20 carbon atoms is 100% by mol,
    wherein the sum of the component (A) and the component (B) is 100 parts by mass; and
a base layer.

2. The stretched laminated film according to claim 1, wherein the propylene-based polymer (A) contains 80 to 100% by mass of a propylene-based polymer (a1) having a melting point (Tm) of not lower than 120° C. but lower than 150° C. measured by differential scanning calorimetry (DSC), and 0 to 20% by mass of a propylene-based polymer (a2) having a melting point (Tm) of not lower than 150° C. but not higher than 170° C. measured by the same method, wherein the sum of the component (a1) and the component (a2) is 100% by mass.

3. The stretched laminated film according to claim 1, wherein the propylene-based polymer (A) contains 95 to 99% by mass of a propylene-based polymer (a1) having a melting point (Tm) of not lower than 120° C. but lower than 150° C. measured by differential scanning calorimetry (DSC), and 1 to 5% by mass of a propylene-based polymer (a2) having a melting point (Tm) of not lower than 150° C. but not higher than 170° C. measured by the same method, wherein the sum of the component (a1) and the component (a2) is 100% by mass.

4. The stretched laminated film according to claim 1, wherein the 1-butene-based polymer (B) is a 1-butene-based polymer (B') having a melting point (Tm) of lower than 120° C. measured by differential scanning calorimetry (DSC) and comprising 10 to 90% by mol of a structural unit derived from 1-butene and 10 to 90% by mol of a structural unit derived from propylene, wherein the sum of the structural unit derived from 1-butene and the structural unit derived from propylene is 100% by mol.

5. The stretched laminated film according to claim 4, wherein the 1-butene-based polymer (B') contains one or more 1-butene-based polymers selected from the group consisting of a 1-butene-based polymer (b1) having a melting point (Tm) of not lower than 90° C. but not higher than 110° C. measured by differential scanning calorimetry (DSC), a 1-butene-based polymer (b2) having a melting point (Tm) of not lower than 65° C. but lower than 90° C.

measured by the same method and a 1-butene-based polymer (b3) having a melting point (Tm) of lower than 65° C. measured by the same method.

6. The stretched laminated film according to claim 5, wherein the 1-butene-based polymer (B') contains two or more 1-butene-based polymers selected from the group consisting of the 1-butene-based polymer (b1), the 1-butene-based polymer (b2) and the 1-butene-based polymer (b3).

7. The stretched laminated film according to claim 5, wherein the 1-butene-based polymer (b1) and the 1-butene-based polymer (b2) are polymers produced by using a metallocene catalyst.

8. A packaging bag in which the peripheral parts of the stretched laminated film according to claim 1 are sealed while the heat-sealable layers are facing inside.

9. A package composed of the packaging bag according to claim 8 housing an item to be packaged.

10. A stretched laminated film having a heat-sealable layer composed of a resin composition which contains 50 to 97 parts by mass of a propylene-based polymer (A) having a melting point (Tm) of not lower than 120° C. but not higher than 170° C. measured by differential scanning calorimetry (DSC), and comprising more than 50% by mol of a structural unit derived from propylene, provided that the propylene-based polymer (A) contains 90 to 99% by mass of a propylene-based polymer (a1) having a melting point (Tm) of not lower than 120° C. but lower than 150° C. measured by differential scanning calorimetry (DSC), and 1 to 10% by mass of a propylene-based polymer (a2) having a melting point (Tm) of not lower than 150° C. but not higher than 170° C. measured by the same method, wherein the sum of the component (a1) and the component (a2) is 100% by mass, and 3 to 50 parts by mass of a 1-butene-based polymer (B) having a melting point (Tm) of lower than 120° C. measured by differential scanning calorimetry (DSC), and comprising 10 to 90% by mol of a structural unit derived from 1-butene and 10 to 90% by mol of a structural unit derived from an α-olefin having 3 or 5 to 20 carbon atoms, wherein the sum of the structural unit derived from 1-butene and the structural unit derived from an α-olefin having 3 or 5 to 20 carbon atoms is 100% by mol, wherein the sum of the component (A) and the component (B) is 100 parts by mass; and a base layer.

11. The stretched laminated film according to claim 10, wherein the propylene-based polymer (A) contains 95 to 99% by mass of a propylene-based polymer (a1) having a melting point (Tm) of not lower than 120° C. but lower than 150° C. measured by differential scanning calorimetry (DSC), and 1 to 5% by mass of a propylene-based polymer (a2) having a melting point (Tm) of not lower than 150° C. but not higher than 170° C. measured by the same method, wherein the sum of the component (a1) and the component (a2) is 100% by mass.

12. The stretched laminated film according to claim 10, wherein the 1-butene-based polymer (B) is a 1-butene-based polymer (B') having a melting point (Tm) of lower than 120° C. measured by differential scanning calorimetry (DSC) and comprising 10 to 90% by mol of a structural unit derived from 1-butene and 10 to 90% by mol of a structural unit derived from propylene, wherein the sum of the structural unit derived from 1-butene and the structural unit derived from propylene is 100% by mol.

13. The stretched laminated film according to claim 12, wherein the 1-butene-based polymer (B') contains one or more 1-butene-based polymers selected from the group consisting of a 1-butene-based polymer (b1) having a melting point (Tm) of not lower than 90° C. but not higher than 110° C. measured by differential scanning calorimetry (DSC), a 1-butene-based polymer (b2) having a melting point (Tm) of not lower than 65° C. but lower than 90° C. measured by the same method and a 1-butene-based polymer (b3) having a melting point (Tm) of lower than 65° C. measured by the same method.

14. The stretched laminated film according to claim 13, wherein the 1-butene-based polymer (B') contains two or more 1-butene-based polymers selected from the group consisting of the 1-butene-based polymer (b1), the 1-butene-based polymer (b2) and the 1-butene-based polymer (b3).

15. The stretched laminated film according to claim 13, wherein the 1-butene-based polymer (b1) and the 1-butene-based polymer (b2) are polymers produced by using a metallocene catalyst.

16. A packaging bag in which the peripheral parts of the stretched laminated film according to claim 10 are sealed while the heat-sealable layers are facing inside.

17. A package composed of the packaging bag according to claim 16 housing an item to be packaged.

* * * * *